United States Patent [19]

Layne et al.

[11] Patent Number: 5,599,156
[45] Date of Patent: Feb. 4, 1997

[54] UNLOADING SHOE SUBASSEMBLY FOR WHEELED HAND TRUCKS

[76] Inventors: Arnold B. Layne; Ella L. Layne, both of R.R. 2, Box 28B, Vermillion, S. Dak. 57069

[21] Appl. No.: 394,158

[22] Filed: Feb. 24, 1995

[51] Int. Cl.$^6$ .................................................. B62B 1/06
[52] U.S. Cl. ..................... 414/490; 414/444; 280/47.28; 280/47.29
[58] Field of Search .................. 414/444–447, 414/490, 280, 661; 280/47.19, 47.24, 47.27, 47.28, 47.29

[56] References Cited

U.S. PATENT DOCUMENTS

| | | | |
|---|---|---|---|
| 2,476,202 | 7/1949 | Lozon, Sr. | 414/490 |
| 2,649,219 | 8/1953 | Nielsen | 414/490 |
| 2,834,494 | 5/1958 | Peters | 414/490 |
| 3,712,496 | 1/1973 | Miller | 414/444 X |
| 5,290,051 | 3/1994 | Olson | 280/47.27 |

FOREIGN PATENT DOCUMENTS

0344952  4/1960  Switzerland .................. 414/490

*Primary Examiner*—Frank E. Werner
*Assistant Examiner*—James W. Keenan
*Attorney, Agent, or Firm*— Law Offices of John A. Beehner

[57] ABSTRACT

An unloading shoe subassembly for use in combination with a hand truck includes a pair of sideframe members and a handle extending between and connecting the sideframe members. A pair of wheeled track assemblies are adapted to be mounted on the frame such that each sideframe member is adjacent one of the wheeled track assemblies and the wheeled track assemblies are generally parallel with one another and generally perpendicular to the load-carrying platform. Each of the wheeled track assemblies includes upper, middle and lower wheel tracks mounted on a support plate in generally coplanar relation with each other. Wheels are slidably mounted within each of the wheel tracks. A shoe assembly including an unloading shoe and at least one shoe support strut is provided, the unloading shoe mounted on the lower end of the strut. The sideframe members are pivotally connected to the wheels in the upper wheel tracks and also pivotally connected to the upper end of the shoe support strut, and the shoe support strut is pivotally connected to the wheels in the middle and lower wheel tracks, the pivotable connections spaced from one another and generally adjacent the upper end of each strut such that as the wheels in the middle and lower wheel tracks are moved, the shoe support strut is tilted to move the unloading shoe generally parallel with the load-carrying platform of a hand truck.

7 Claims, 8 Drawing Sheets

UNLOADING SHOE SUBASSEMBLY FOR WHEELED HAND TRUCKS

BACKGROUND OF THE INVENTION

1. Technical Field

This invention relates to an unloading shoe subassembly for use in combination with a hand truck and, more particularly, to an unloading shoe subassembly for use with a wheeled hand truck which includes a pair of wheeled track assemblies each including three tracks and wheels slidably mounted within each of the tracks, a shoe assembly including a shoe and at least one shoe support strut, and a handle including a pair of sideframe members, the sideframe members pivotably connected to the wheel in the upper track and also to the shoe support strut, the shoe support strut pivotably connected to the wheels in the middle and lower tracks whereby the shoe support strut is tilted to move the shoe generally parallel with the load-carrying platform of a hand truck.

2. Description of the Prior Art

The use of hand trucks for moving relatively small but heavy objects from one place to another is a generally common practice. For example, delivery companies such as United Parcel Service or Federal Express supply hand trucks to their delivery people to facilitate the transport of materials from one location to another. Also, furniture and appliance movers commonly use the 2-wheeled hand truck for transporting any items to be moved.

A typical hand truck would include the following features: an upright frame commonly including a pair of upright frame members, a generally horizontal load-carrying platform mounted at the lower end of the frame and a pair of wheels attached to the frame by an axle. The hand truck may also include a handle for simplifying transport of the hand truck.

Parcels are removed from the hand truck by tilting the load-carrying platform forwards and sliding the platform from underneath the parcels. There are several disadvantages to this method of removing packages from the platform, including that the packages must be tilted to be removed from the load-carrying platform, which may result in unbalancing of the load, or that in removing the load-carrying platform from underneath the packages being carried thereon, the underside of the package may be damaged due to the contact between the edges of the load-carrying platform and the underside of the box. There is therefore a need for an easily operated unloading mechanism for use in connection with hand trucks which will remove packages on the hand truck from the load-carrying platform.

Several unloading devices have been proposed in the prior art, of which by far the most common tend to include an unloading shoe and a handle, the shoe connected to the bottom end of the handle and the handle pivotably connected to the upright frame of the hand truck. Of course, the problem with such an arrangement is that as the handle is pivoted, not only is the unloading shoe moved forward relative to the upright frame but also moves upward due to the pivoting action of the handle. This can damage packages, particularly cardboard boxes, which are being removed from the hand truck, due to the sliding contact between the unloading shoe and the side of the box.

Of course, others have tried to address this problem, including Olson, U.S. Pat. No. 5,290,051, and others. Olson for example, provides a pivotal and slidable connection which includes a scissor link pivotally interconnecting the sideframe elements of the handle and corresponding upright elements of the hand truck frame, the scissor link causing the unloading shoe to move substantially horizontally across the load-carrying platform. Because of the scissor link construction of such devices, however, applications of large amounts of force to the handle, as would be done in removing a very heavy object from the hand truck, can result in failure of the unloading shoe subassembly. This is due to the fact that the scissor link design of the device pivots about a single pivot pin at all times, thus greatly increasing the wear and tear on the single pivot point. There is therefore a need for an unloading shoe subassembly which is sturdy in use and may be quickly and easily added to existing hand trucks.

Therefore, an object of the present invention is to provide an improved unloading shoe subassembly for use in connection with a hand truck.

Another object of the present invention is to provide an unloading shoe subassembly which may be quickly and easily added to existing hand trucks.

Another object of the present invention is to provide an unloading shoe subassembly in which the unloading shoe can be moved forwardly generally parallel with the load-carrying platform to unload packages from the hand truck without damaging the exterior of the packages.

Another object of the present invention is to provide an unloading shoe subassembly for a hand truck which is extremely sturdy in construction in order to allow the unloading shoe to remove relatively heavy objects from the load-carrying platform.

Another object of the present invention is to provide an unloading shoe subassembly for a hand truck which is spring-loaded to return the handle to an upright position substantially removed from interfering with the use of the hand truck in normal operation.

Another object of the present invention is to provide an unloading shoe subassembly for a hand truck, the subassembly including a pair of wheeled track assemblies for mounting on the hand truck frame, each of the wheeled track assemblies including upper, middle and lower tracks and wheels mounted within the tracks, the subassembly further including a shoe assembly having a shoe support strut, the shoe support strut pivotably attached to the wheels in the middle and lower tracks, and a handle for extending the shoe support shoe forwards is pivotably connected to the wheel in the upper track and one end of the shoe support strut.

Finally, an object of the present invention is to provide an unloading shoe subassembly which is relatively simple to manufacture, durable in construction and safe and efficient in use.

SUMMARY OF THE INVENTION

The unloading shoe subassembly of the present invention is designed for use in combination with a hand truck, the hand truck including a frame which has an upright frame section and a load-carrying platform mounted on the upright frame at a lower end thereof. The hand truck further includes a pair of wheels attached to the frame by an axle. The subassembly includes a pair of sideframe members each having an upper end, a center section and a lower linkage section, and a handle extends between and connects the upper ends of the sideframe members. A pair of wheeled track assemblies are adapted to be mounted on the hand truck frame such that each side frame member is adjacent one of the wheeled track assemblies and the wheeled track assemblies are generally parallel with one another and generally perpendicular to the load-carrying platform. Each of the wheeled track assemblies includes upper, middle and lower wheel tracks, the tracks mounted on a support plate in generally coplanar relation with one another. Wheels are slidably mounted within each of the tracks, each wheel including a transversely projecting axle.

A shoe assembly includes an unloading shoe and at least one shoe support strut having upper and lower ends, the unloading shoe mounted on the lower end of the strut. The linkage sections of the sideframe members are pivotably connected to the axle of the wheel in the upper track and also are pivotably connected to the upper end of the shoe support strut, the pivotable connections spaced and connected at opposite ends of the linkage sections. Finally, the shoe support strut is pivotably connected to the axles of the wheels in the middle and lower tracks, the pivotable connections spaced from one another and generally adjacent the upper end of the strut such that as the wheels in the upper and lower tracks are moved, the shoe support strut is tilted to move the unloading shoe generally parallel with the load-carrying platform of the hand truck.

The present invention thus provides a substantial improvement over those devices found in the prior art. For example, because the wheeled track assemblies are designed to be mounted on an upright frame of a hand truck, the unloading shoe of the present invention may be quickly and easily added to already existing hand trucks. Additionally, because the wheeled track assemblies each include three wheeled tracks to which the handle and shoe support strut are connected, the entire subassembly is much sturdier in use than those devices found in the prior art. Because of the levering action of the handle relative to the shoe support strut, even very heavy objects may be easily, safely and quickly removed from the hand truck. This is mainly due to the increased distance from the fulcrum of the handle to the top of the handle, which necessarily results in the situation that less force need be applied to the handle to remove the hand truck from beneath the object being carried. Finally, because the unloading shoe extends and retracts substantially horizontally (i.e. generally parallel with the load-carrying platform), no damages is caused to packages carried by the load-carrying platform due to frictional contact between the package and the unloading shoe. It is thus seen that the present invention provides a substantial improvement over those devices found in the prior art.

DESCRIPTION OF THE PREFERRED EMBODIMENT

The unloading shoe subassembly 10 of the present invention is shown best in FIGS. 1–5 as being mounted on a standard-type hand truck 100. Hand truck 100 preferably includes an upright frame 102 having a pair of upright generally parallel sidebars 104a and 104b connected to one another at the top edges thereof by a top handle section 106. A set of generally horizontal stiffening struts 108a, 108b, 108c and 108d extend between the upright sidebars 104a and 104b and are connected thereto to provide additional structural strength to the upright frame 102. A vertical stiffening strut 110 may also be included which extends vertically down and is connected to each of the stiffening struts 108a–d.

Figure 1:
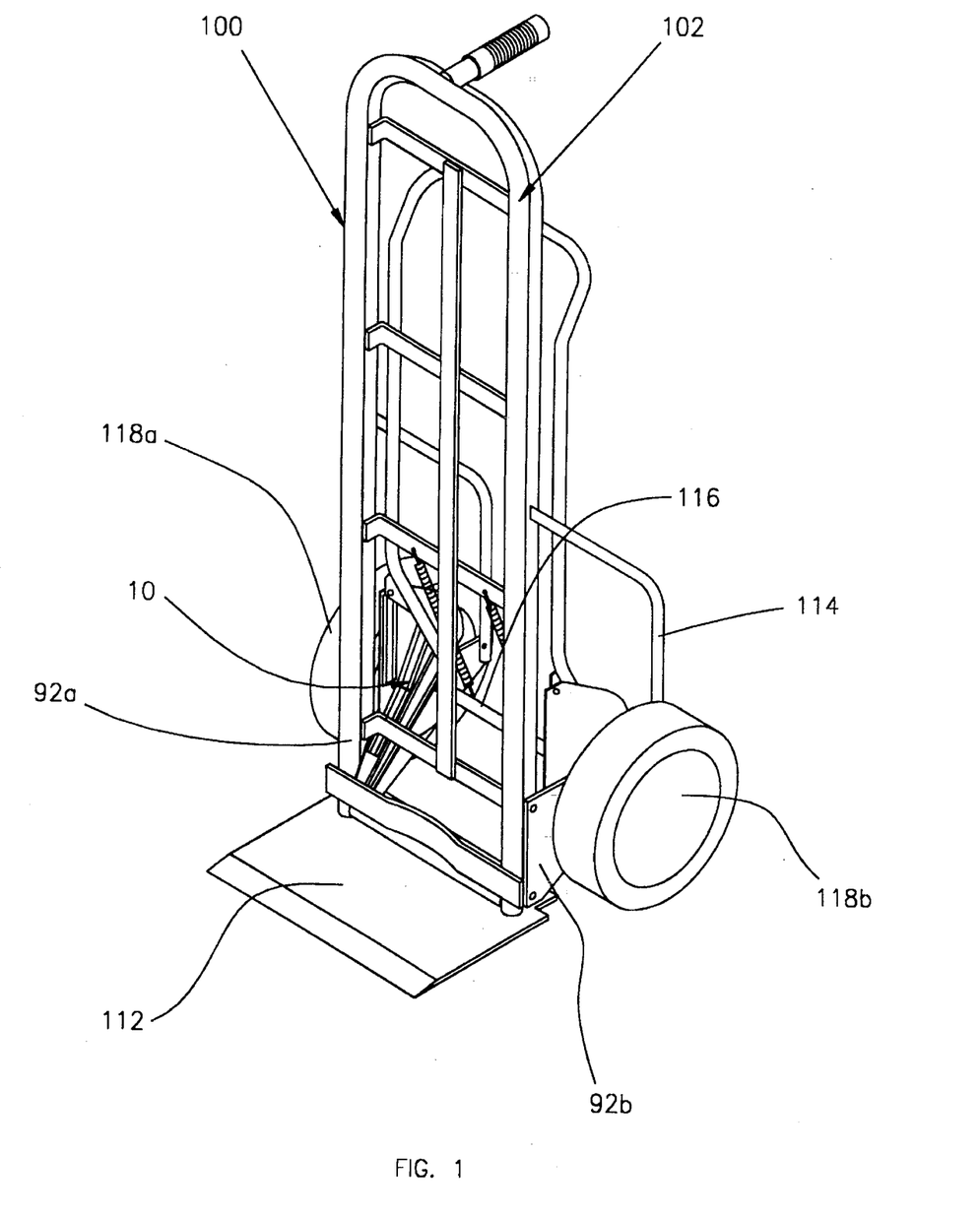
FIG. 1 is a perspective view of the unloading shoe subassembly mounted on a hand truck.
Figure 5:
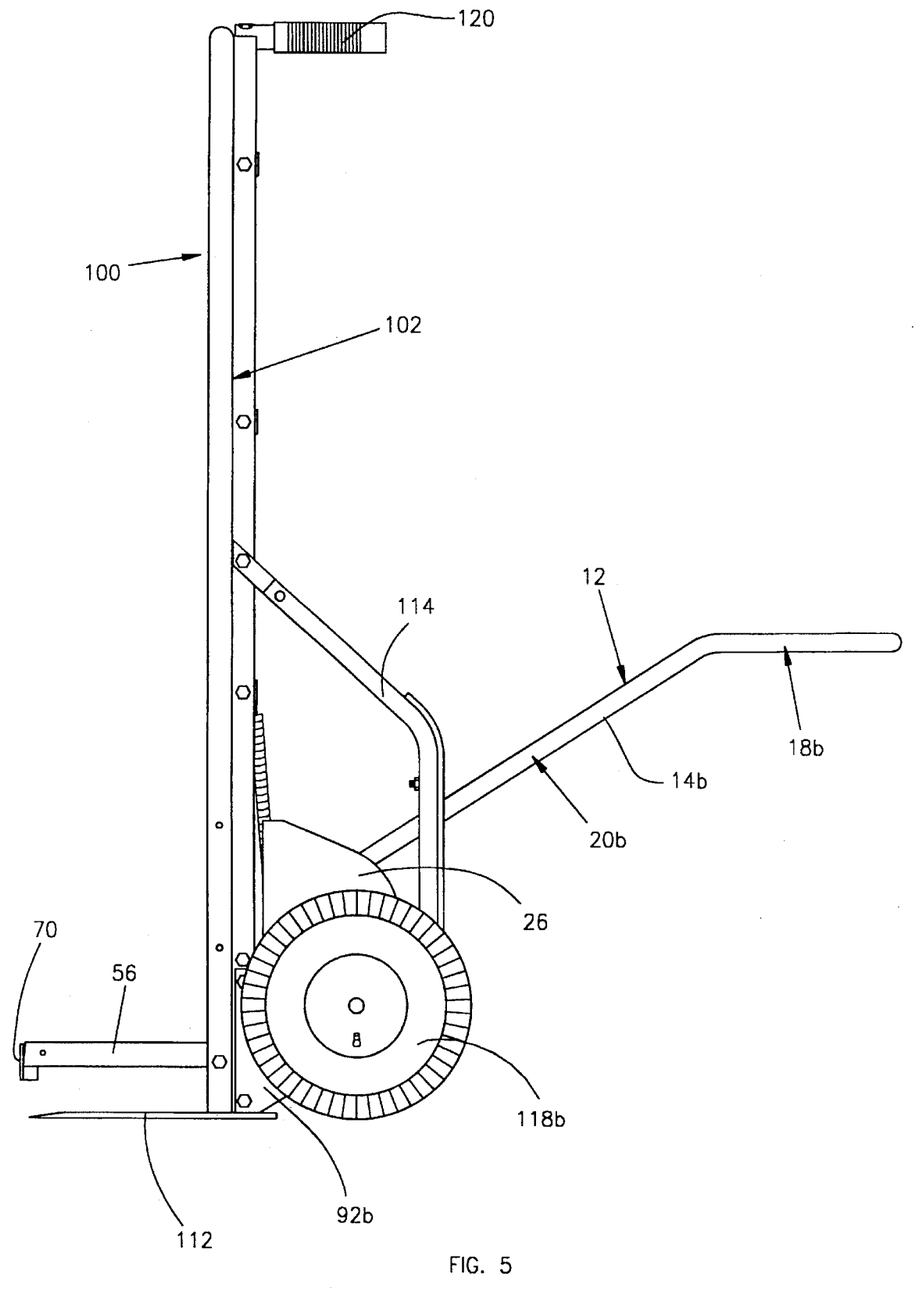
FIG. 5 is a side elevational view of the unloading shoe subassembly mounted on a hand truck with the unloading shoe extended in response to tilting of the handle backwards.

Mounted on the lower end of the upright frame 102 and extending forwardly therefrom is a load-carrying platform 112 which is preferably a flat piece of plate metal having a high degree of tensile strength. It is preferred that the load-carrying platform 112 extend generally perpendicular to the upright frame 102, as shown in FIGS. 1 and 5. Finally, a rearwardly projecting axle frame 114 is connected to the upright frame 102, the axle frame 114 rotatably supporting an axle 116 on which a pair of hand truck wheels 118a and 118b are mounted. Hand truck 100 may also include a rearwardly projecting top handle 120 for more easily controlling movement of the hand truck 100.

The unloading shoe subassembly 10 is best shown in FIGS. 1–7 as including a generally U-shaped subassembly handle 12 which includes a pair of sideframe members 14a and 14b and a top handle bar 16 extending between and connecting the sideframe members 14a and 14b. Each of the sideframe members 14a and 14b includes an upper handle section 18a and 18b, a middle section 20a and 20b and a lower linkage section 22a and 22b. In the preferred embodiment, when the middle sections 20a and 20b of the sideframe members 14a and 14b are aligned generally parallel with the upright sidebars 104a and 104b of hand truck 100, upper sections 18a and 18b are angled slightly rearwards from middle sections 20a and 20b, as shown in FIGS. 1 and 5, and lower linkage sections 22a and 22b would be angled rearwardly of the middle sections 20a and 20b, as shown best in FIGS. 6 and 7. It is preferred that sideframe members 14a and 14b and top handle 16 be constructed of rolled steel tubing to provide sufficient structural strength for the intended application of the unloading shoe subassembly 10.

The second main structure of the unloading shoe subassembly 10 is mounted on the upright frame 102 of hand truck 100 and extends rearwardly therefrom. This section of the unloading shoe subassembly 20 includes a pair of wheeled track assemblies 24 and 26 each mounted on one of the upright sidebars 104a and 104b of the hand truck 100. Wheeled track assemblies 24 and 26 should be understood to be substantially identical to one another, and therefore the following description, while pertaining solely to wheeled track assembly 24, should also be understood to pertain to wheeled track assembly 26 with regards to the structure and features thereon.

Wheeled track assembly 24 preferably includes a generally triangular support plate 28 which, in the preferred embodiment, would be constructed of high tensile strength plate metal. While it is preferred that support plate 28 be generally triangular in shape, it is to be understood that the precise shape and size of the support plate 28 is not critical to the present invention, so long as the support plate 28 provides sufficient structural support for the remaining features of the wheeled track assembly 24.

Mounted on support plate 28 are first, second and third wheel tracks 30, 32 and 34, which may also be referred to as the upper, middle and lower wheel tracks It is preferred that each wheel track 30, 32 and 34 consist of a wheel-receiving channel having a generally flattened C-shaped cross section, which acts to prevent a wheel slidably housed within the wheel track 30, 32 and 34 from falling out of the wheel track except at the upper and lower ends of the wheel track. Each wheel track 30, 32 and 34 further includes a wheel 36, 38 and 40 slidably housed within each of the first, second and third wheel tracks 30, 32 and 34, each wheel 38 and 40 having a diameter slightly smaller than the internal width of each of the wheel tracks 30, 32 and 34, such that each wheel 36, 38 and 40 may be housed within the wheel track 30, 32 and 34 yet be prevented from exiting the wheel track except at the upper or lower ends of each wheel track. While the following description refers to the wheels 36, 38 and 40 being "slidably housed" within wheel tracks 30, 32 and 34, it is to be understood that the wheels actually rotate or roll within the wheel tracks. However, it is to be further understood that the wheels may be replaced by sliding trolleys or the like, so long as the structure housed within each wheel track may move freely along the longitudinal axis of the respective wheel track. Extending transversely from each wheel 36, 38 and 40 is an axle 42, 44 and 46, each of which is designed to facilitate attachment of structure to each of the first, second and third wheels, 36, 38 and 40.

Figure 6:
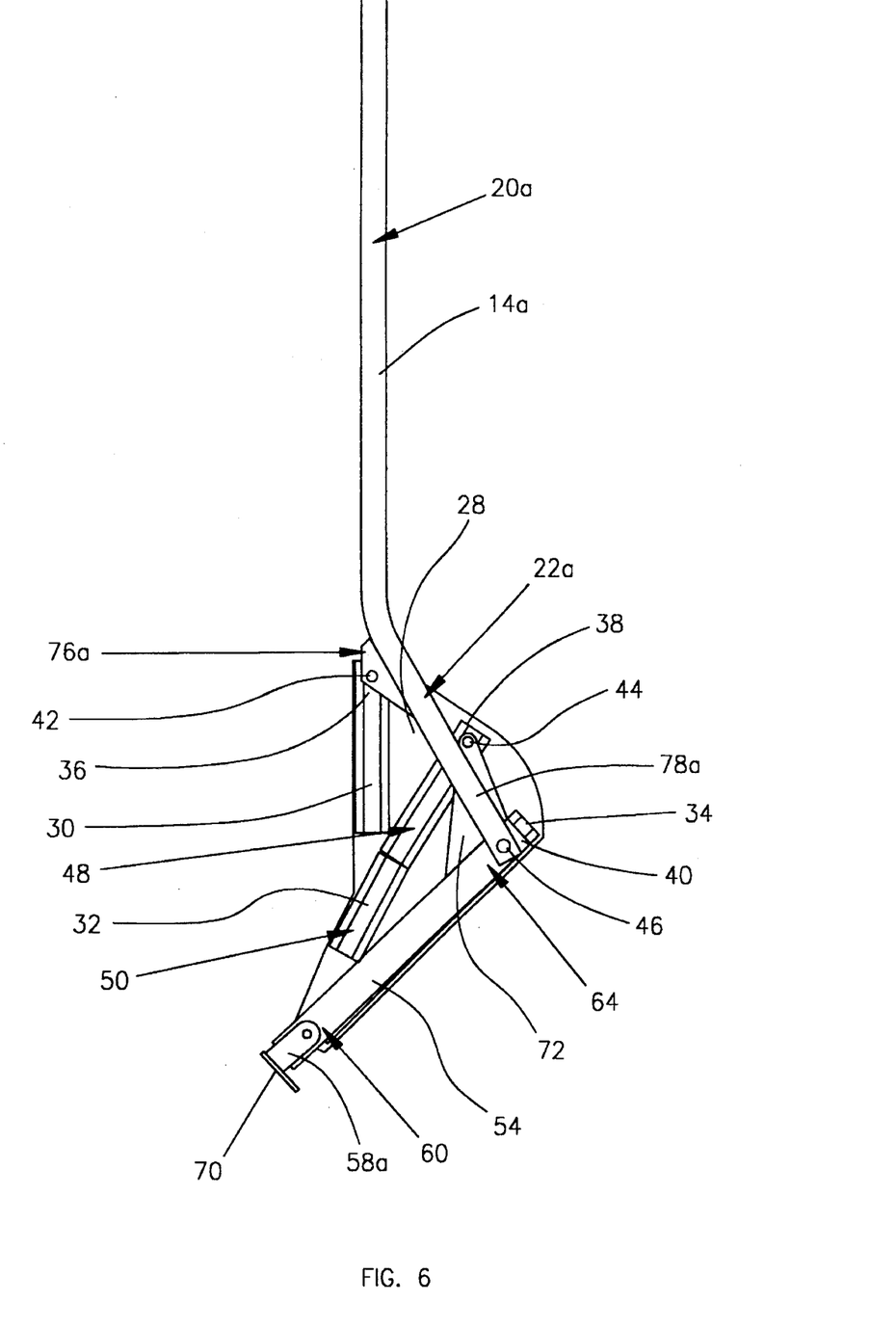
FIG. 6 is a partial side detail elevational view showing one of the wheeled track assemblies in detail.
Figure 7:
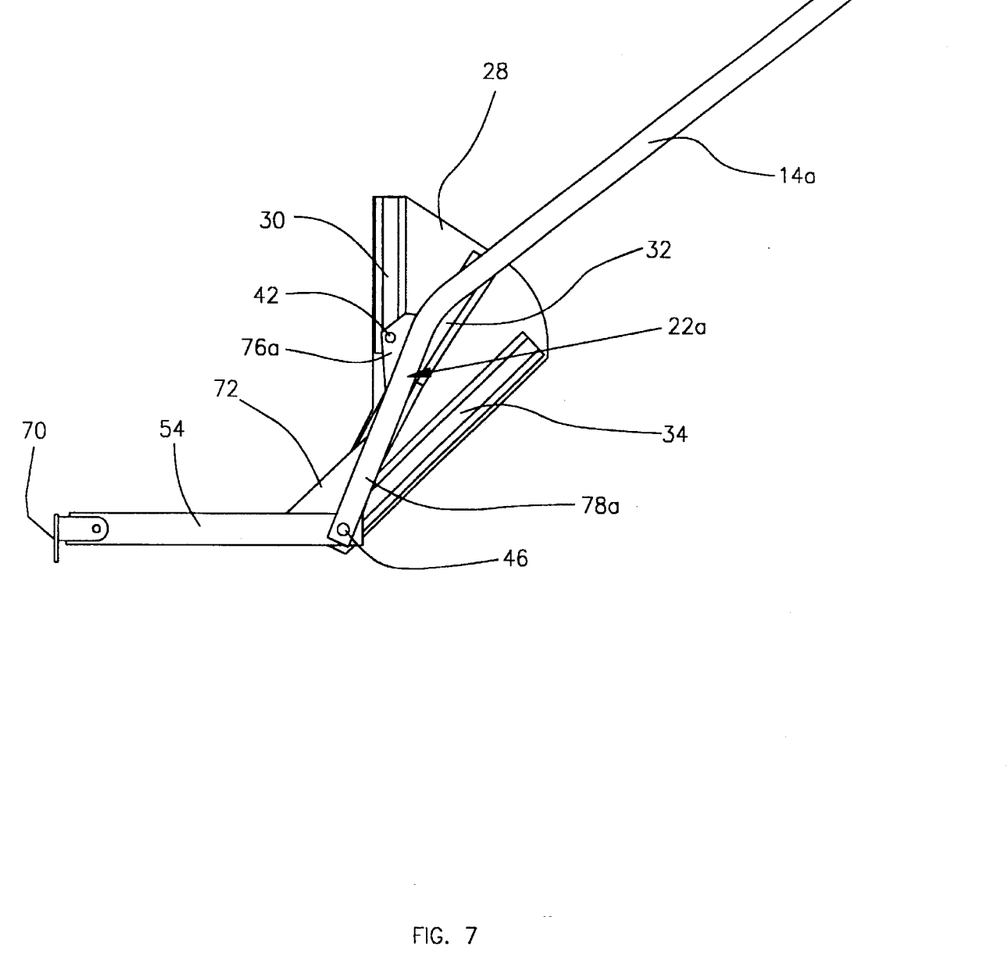
FIG. 7 is a partial side detail elevational view as in FIG. 6, but exhibiting the unloading shoe extended forwards.

As is best shown in FIGS. 6 and 7, the first wheel track 30 extends generally upright on the support plate 28. The second wheel track 32 is positioned below first wheel track 30 and is angled rearwardly therefrom, with the lower end of second wheel track 32 extending slightly forward of first wheel track 30. It is preferred that the angle between first and second wheel tracks 30 and 32 be between 20° and 40°, although this angle is not critical in and of itself. Rather, the angle between first and second wheel tracks 30 and 32 is critical only towards the end result of extending the unloading shoe 70 forwards generally parallel with the load-carrying platform 112. Second wheel track 32 may also include upper and lower track sections 48 and 50, lower track section 50 angled slightly downwards from upper track section 48, thus increasing the downward rate of movement of second wheel 38 within second wheel track 32. Once again, however, the inclusion of upper and lower track sections 48 and 50 is only critical in promoting the forward motion of the unloading shoe 70 in a generally horizontal path.

Third wheel track 34 is preferably spaced below second wheel track 32 and first wheel track 30, and is angled between 30° and 70° from the first wheel track 30, as shown in FIGS. 6 and 7. Therefore, the angle between second and third wheel tracers 32 and 34 would be between 10° and 40°. The lower end of third wheel track 34 would preferably extend forwardly of the lower end of second wheel track 32, and thus is of slightly greater length than second wheel track Unloading shoe subassembly 10 further includes a shoe assembly 52 having an unloading shoe 70 and a pair of shoe support struts and 56, shown best in FIGS. 1 and 3. It is preferred that unloading shoe 70 be connected to the lower ends of shoe support struts 54 and 56 by a pivotal bracket connection 58a and 58b, which allows the unloading shoe 70 to remain in full contact with the packages being removed from the load-carrying platform 112 as the shoe support struts 54 and 56 are extended. Of course, any type of connection between the shoe support struts 54 and 56 and unloading shoe 70 is acceptable, the pivoting bracket connection being preferred.

It is preferred that unloading shoe 70 be constructed as a generally flat metal bar extending across substantially the entire width of load-carrying platform 112. Of course, unloading shoe 70 may include various angles and/or curves to increase the efficiency with which the unloading shoe 70 removes packages from the load-carrying platform 112. Regarding shoe support struts 54 and 56, it is preferred that these be constructed of two substantially identical lengths of square tubing, each including a lower end and 62, and an upper end 64 and 66, as shown best in FIG. 4.

Figure 3:
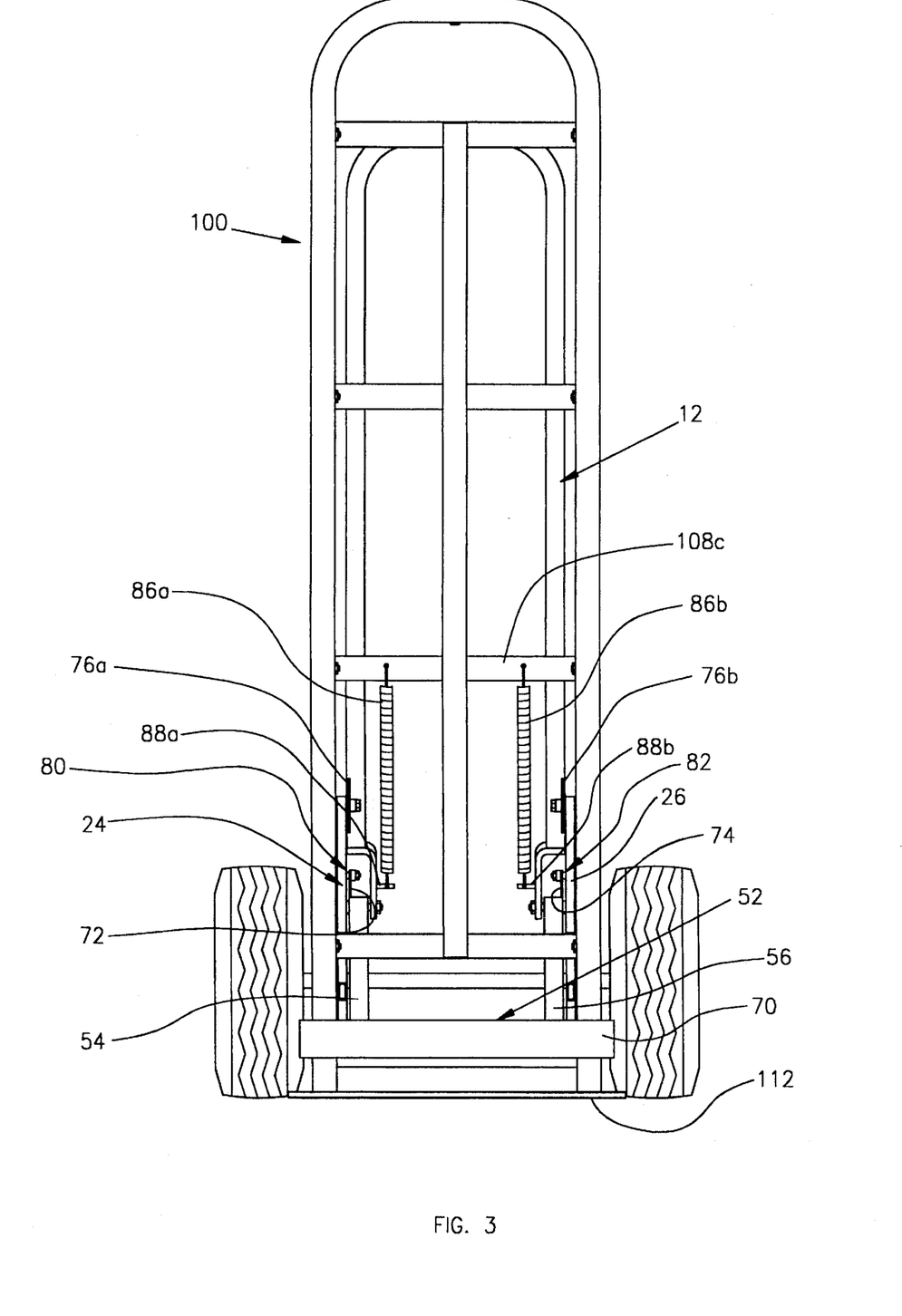
FIG. 3 is a front elevational view of the unloading shoe subassembly mounted on a hand truck.

Mounted on each of the upper ends 64 and 66 of the shoe support struts 54 and 56 and projecting upwardly therefrom are a pair of pivotal connection arms 72 and 74 which are generally triangular in shape and are angled slightly rearwards of the upper ends 64 and 66 of the shoe support struts 54 and 56, as shown best in FIGS. 3, 6 and 7. It is preferred that each connection arm 72 and 74 be constructed of a generally flat section of plate metal which is welded on one side thereof to each of the shoe support struts 54 and 56.

Figure 2:
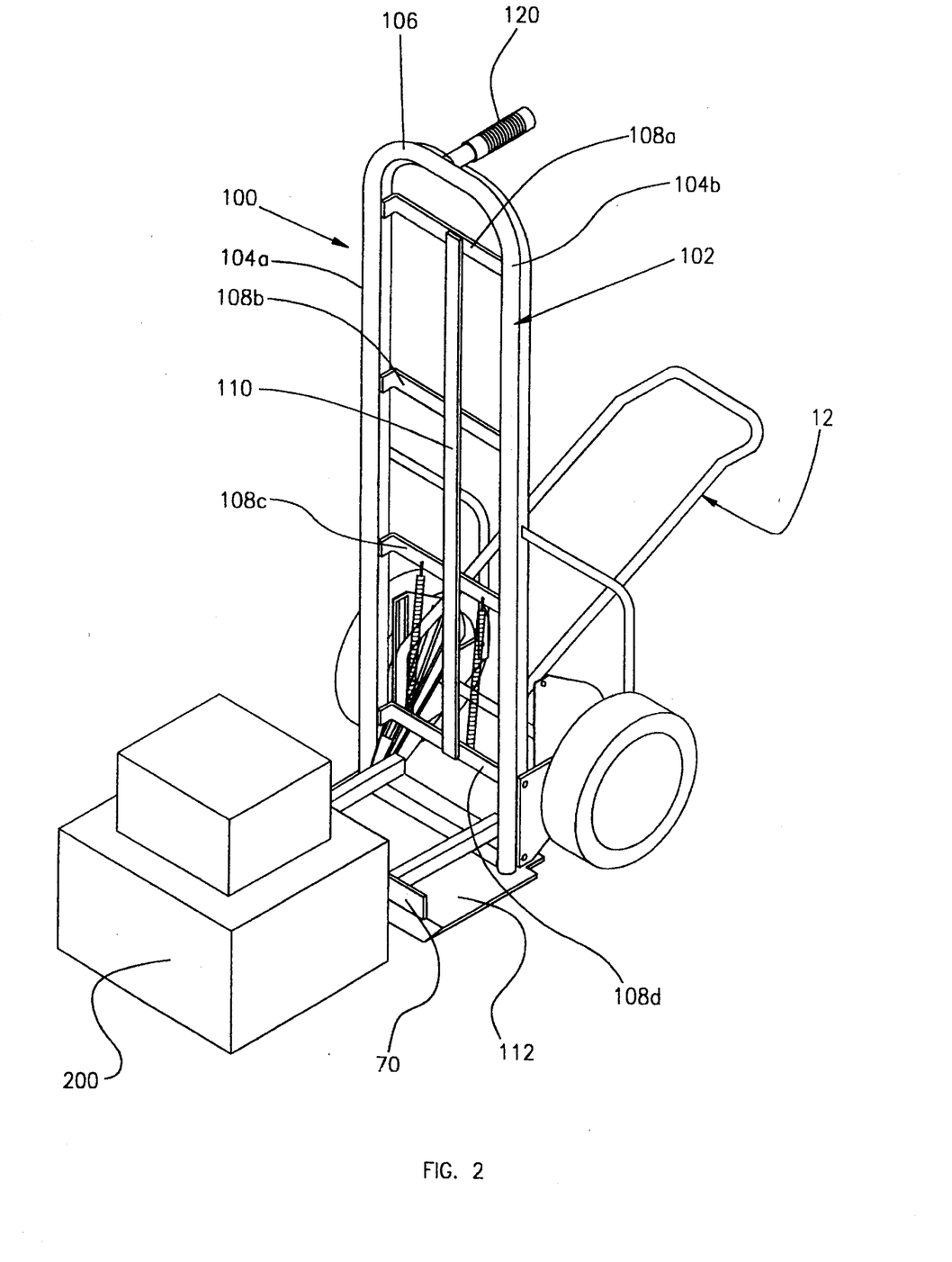
FIG. 2 is a perspective view of the unloading shoe subassembly being operated to remove packages from the load-carrying platform of the hand truck.

The pivotal connections of the U-shaped handle 12 to the shoe assembly 52 are best shown in FIGS. 6 and 7. Each of the lower linkage sections 22a and 22b outside frame members 14a and 14b include an axle connection stub 76a and 76b projecting from the forward side of the linkage section 22a and 22b, as shown in FIGS. 6 and 7. Each axle connection stub 76a and 76b is pivotally connected to the axle 42 projecting from the first wheel 36 of the adjacent wheeled track assembly 24 or 26. Directly below the point of connection of connection stub 76a and 76b to lower linkage section 22a and 22b, each lower linkage section 22a and 22b includes a bottom-most L-shaped leg 78a and 78b each of which are connected to one of the sideframe members 14a and 14b and are thus integral therewith. The L-shaped legs 78a and 78b are required in order to allow the linkage section 22a and 22b to be pivotally connected to the upper ends 64 and 66 of the respective shoe support struts 54 and 56, as shown in FIGS. 2 and 3. The third axle 46 projecting from third wheel 40 within wheel track 34 extends through the upper end 64 and 66 of the shoe support struts 54 and 56 and then is pivotally connected to the lower end of the L-shaped legs 78a and 78b, the connection being such that the L-shaped legs 78a and 78b may pivot independently of shoe support struts 54 and 56.

Connection arms 72 and 74 on shoe support struts 54 and 56 each further include an axle-receiving hole 80 and 82 formed adjacent the uppermost corner of each connecting arm 72 and 74 through which second axles 44 on second wheel 38 in wheel track 32 may be extended and secured, as shown in FIGS. 6 and 7. When second axle 44 on each respective wheel track assembly 24 and 26 is extended through holes 80 and 82, each shoe support strut is pivotally connected to second and third wheels 38 and 40 in wheel tracks 32 and 34, as shown in FIGS. 6 and 7. Connection arms 72 and 74 may be secured to second axle 44 by nuts 84a and 84b or the like.

Figure 4:
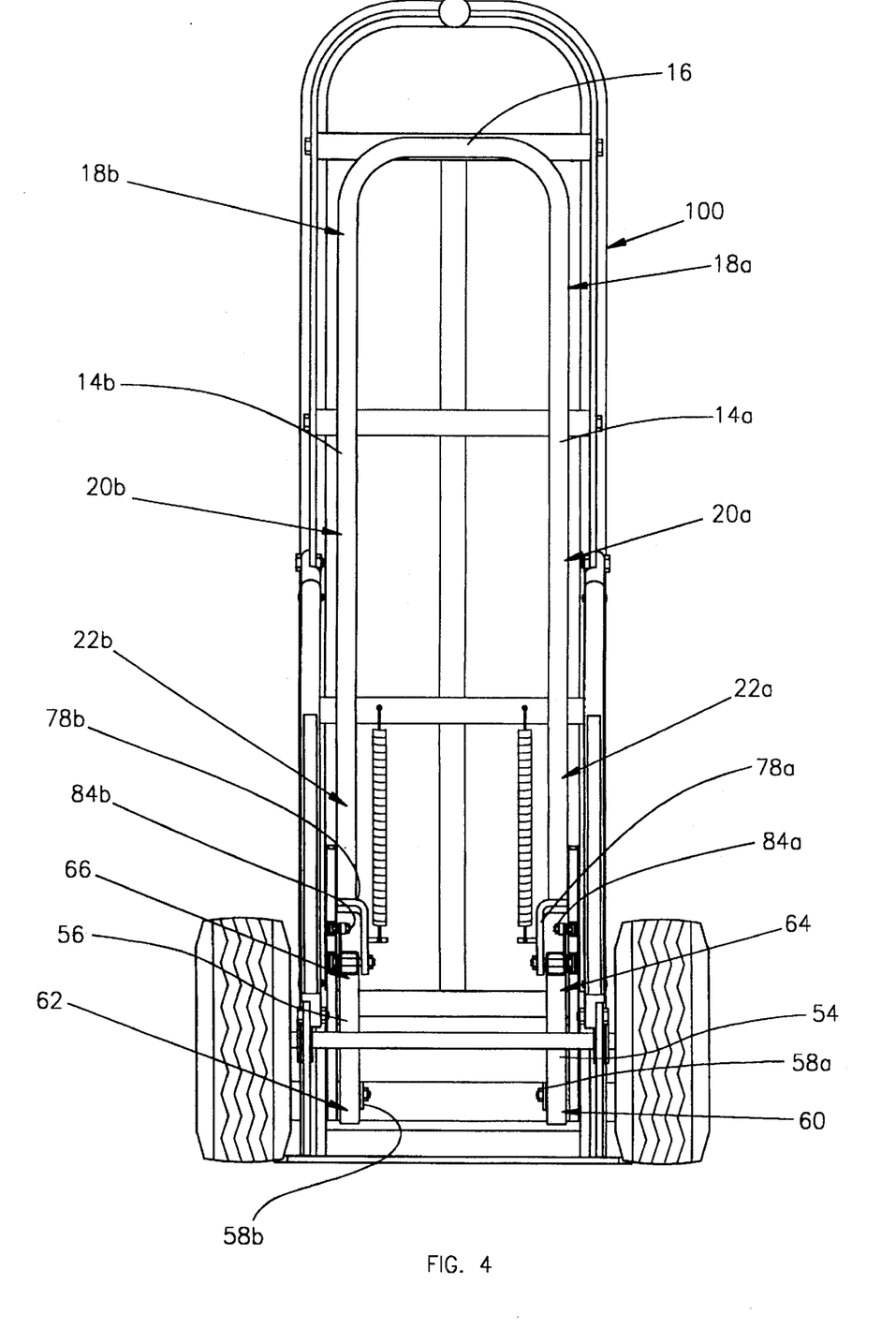
FIG. 4 is a rear elevational view of the invention.

It is the combination of these three pivotal connections which extends the unloading shoe 70 generally parallel with the load-carrying platform 112. FIG. 6 shows the unloading shoe subassembly 10 in retracted or rest position. To extend shoe 70, handle 12 is pulled rearwards of the upright frame 102, as shown in FIG. 5 Each sideframe member 14a and 14b thus pivots about first axle 42 on respective left and right wheeled track assemblies 24 and 26, and therefore L-shaped legs 78a and 78b are thrust forwards relative to the upright frame 102. Due to the connection of shoe support struts 54 and 56 and connection arms 72 and 74 to the second and third wheel tracks 32 and 34 on each of the left and right wheel track assemblies 24 and 26, the lower ends 60 and 62 of the left and right shoe support struts 54 and 56 are moved forwardly of the upright frame 102 generally parallel with the load-carrying platform 112. As second and third wheels 38 and 40 move within second and third wheel tracks 32 and 34, the lower ends and 62 of the shoe support struts 54 and 56 are thrust forwardly at a generally constant height above the load-carrying platform 112. Finally, when the unloading shoe 70 is fully extended, the track assembly 24 is in the position shown in FIG. 7 with the first, second and third wheels 36, 38 and 40 all moved toward the ends of the respective first, second and third wheel tracks and 34. It is this unique combination of the orientation of the three wheel tracks 30, 32 and 34 and the pivotal connections of the first, second and third axles 42, 44 and 46 to the sideframe members 14a and 14b, connection arms 72 and 74 and shoe support struts 54 and 56 which enables the unloading shoe 70 to extend and retract generally parallel with the load-carrying platform For returning the handle 12 to a generally upright position, a pair of springs 86a and 86b, shown best in FIGS. 3 and 4, are provided, the springs connected at the top ends thereof to one of the stiffening struts 108c and connected at the lower end thereof to a pair of projecting pins 88a and 88b mounted on a respective one of the L-shaped legs 78a and 78b.

Finally, for providing additional structural rigidity to the unloading shoe subassembly 10, a pair of sideframe-engaging plates 92a and 92b are provided for further securing the unloading shoe subassembly 10 to the upright frame 102 of the hand truck.

Figure 8:
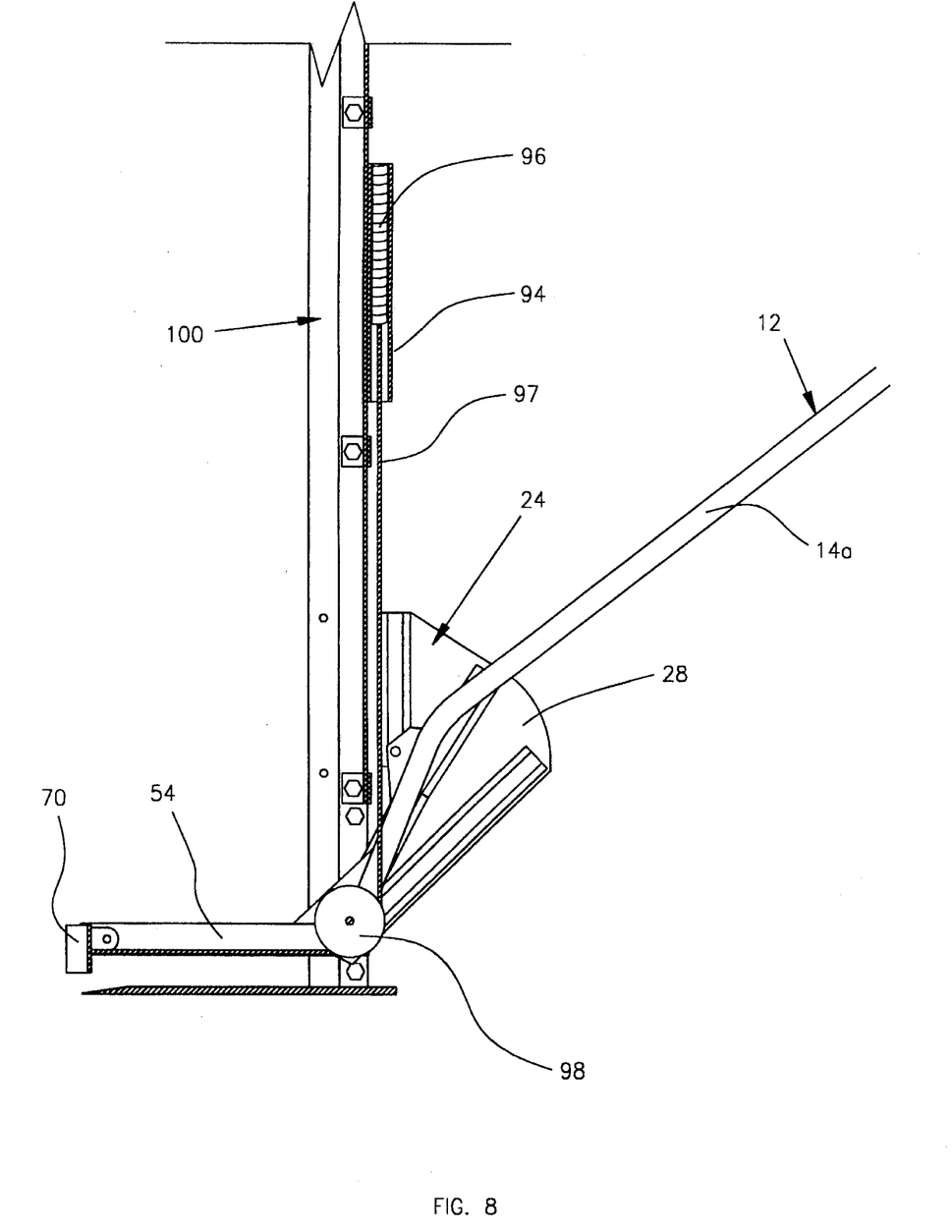
FIG. 8 is a partial side detail elevational view of an alternative embodiment of the present invention displaying an alternative spring system structure.

An alternative embodiment of the spring connection is shown in FIG. 8 as including an extended tube 94 mounted on the vertical stiffening strut 110. The tube 94 houses a single spring 96 fixedly connected at the top end of the tube 94 and connected to a cable 97 at the bottom end thereof. The cable 97 extends downwards through the tube 94 and exits the bottom thereof, extending around pulley 98 and connecting to the rear side of unloading shoe Therefore, when handle 12 is pulled rearwards and downwards, spring 96 is extended as unloading shoe 70 moves forward. Upon the releasing of handle 12, spring 96 retracts within tube 94, thus pulling cable 97 upwards into tube 94 around pulley 97, thus retracting unloading shoe 70 to its original unextended position.

It is an important feature of the present invention that the usable lifespan of the unloading shoe subassembly 10 is greatly increased due to the use of three movable pivot points, referred to as axles 42, 44, and 46. As the forces applied to the subassembly are distributed throughout the pivotal connections, no single axle bears an inordinate amount of force. Therefore, no one axle is more prone to failure than another, thus resulting, on average, in an increased lifespan for the subassembly. Also, it should be noted that when unloading shoe 70 is extended, in most situations it is the hand truck 100 which is moved rearwards from underneath the load 200 and not vice versa, as shown in FIG. 2.

It is to be understood that numerous modifications, additions and substitutions may be made to the invention described herein which fall within the intended broad scope of the appended claims. For example, the size, shape and construction materials of the elements of the present invention may be modified to a great extent without disrupting the functioning of the present invention. Furthermore, various other types of spring return devices may be utilized other than those described previously. Additionally, the precise connections and arrangements of the unloading shoe subassembly 10 may be modified so long as the unloading shoe 70 extends and retracts generally parallel with the load-carrying platform 112.

There has thus been set forth and described an invention which accomplishes at least all of the stated objectives.

We claim:

1. An unloading shoe subassembly for use in combination with a hand truck having a frame which includes an upright frame section and a load-carrying platform mounted on said upright frame section at a lower end thereof and having a pair of wheels attached to the frame by an axle, said subassembly comprising;

a pair of sideframe members each having an upper end, a center section and a lower linkage section;

a handle extending between and connecting said upper ends of said sideframe members;

a pair of wheeled track assemblies for mounting on said frame such that each sideframe member is adjacent one of said wheeled track assemblies and said wheeled track assemblies are generally parallel with one another and generally perpendicular to the load-carrying platform;

each of said wheeled track assemblies including upper, middle and lower track means and support means, said upper, lower, and middle track means mounted on said support means in generally coplanar relation with each other;

follower means slidably mounted within each of said track means;

a shoe assembly including shoe means and at least one shoe support strut having upper and lower ends, said shoe means mounted on said lower end of said strut;

said linkage sections of said sideframe members pivotably connected to said follower means in said upper track means and said upper end of said shoe support strut, said pivotable connections spaced and connected at opposite ends of said linkage sections; and said shoe support strut pivotably connected to said follower means in said middle and lower track means, said pivotable connections spaced from one another and generally adjacent said upper end of said strut whereby as said follower means in said middle and lower track means are moved, said shoe support strut is tilted to move said shoe means generally parallel with the load-carrying platform of a hand truck.

2. The unloading shoe subassembly of claim 1 wherein said follower means comprise wheels having transversely projecting axles mounted at the centers thereof, each of said axles adapted to pivotally connect to a respective one of said shoe support strut and said sideframe members.

3. The unloading shoe subassembly of claim 1 wherein said shoe means comprises an unloading shoe having a generally flat, upright front surface for engaging an object on the hand truck.

4. The unloading shoe subassembly of claim 1 wherein said linkage sections of each of said sideframe members are angled relative to said center sections such that when said center sections are positioned generally upright, said linkage sections extend rearwards and downwards therefrom.

5. An unloading shoe subassembly for use in combination with a hand truck having a frame which includes an upright frame section and a load-carrying platform mounted on said upright frame section at a lower end thereof and having a pair of wheels attached to the frame by an axle, said subassembly comprising;

a pair of sideframe members each having an upper end, a center section and a lower linkage section;

a handle extending between and connecting said upper ends of said sideframe members;

a pair of wheeled track assemblies for mounting on said frame such that each sideframe member is adjacent one of said wheeled track assemblies and said wheeled track assemblies are generally parallel with one another and generally perpendicular to the load-carrying platform;

each of said wheeled track assemblies including first, second and third track means and support means, said first, second, and third track means mounted on said support means in generally coplanar relation with each other;

first, second and third follower means slidably mounted within a respective one of said first, second and third track means;

said first track means extending generally upright;

said second track means extending at an angle relative to said first track means, said second track means positioned below said first track means such that a forward end of said second track means extends below and forward of said first track means and a rearward end is positioned rearwards of said first track means above said forward end of said second track means;

said third track means extending at an angle relative to said second track means, said third track means positioned below said second track means such that a forward end of said third track means extends below and generally adjacent said second track means and a rearward end is positioned below and rearwards of said second track means above said forward end of said third track means;

a shoe assembly including shoe means and at least one shoe support strut having upper and lower ends, said shoe means mounted on said lower end of said strut;

said upper end of said strut further including a linkage member having a mounting end and an outer end, said member mounted thereon and extending generally perpendicular thereto;

said linkage section of each of said sideframe members pivotably connected to a respective first follower means in said first track means and said upper end of said shoe support strut; and said shoe support strut pivotably connected to said second and third follower means of both of said wheeled track assemblies, said third follower means connected at said upper end of said strut, said second follower means connected to said outer end of said linkage member such that as said second and third follower means are moved within said second and third track means in response to pivoting of said sideframe members about said pivotal connection to said first follower means, said shoe support strut is tilted to move said shoe means generally parallel with the load-carrying platform of a hand truck.

6. In combination:

a hand truck having a frame which includes an upright frame section and a load-carrying platform mounted on said upright frame at a lower end thereof and a pair of wheels attached to the frame by an axle;

an unloading shoe subassembly comprising;

at least one sideframe member having an upper end, a center section and a lower linkage section;

a pair of wheeled track assemblies for mounting on said frame such that said sideframe member is positioned between said wheeled track assemblies and said wheeled track assemblies are generally parallel with one another and generally perpendicular to the load-carrying platform;

each of said wheeled track assemblies including upper, middle and lower track means and support means, said upper, lower, and middle track means mounted on said support means in generally coplanar relation with each other;

follower means slidably mounted within each of said track means;

a shoe assembly including shoe means and at least one shoe support strut having upper and lower ends, said shoe means mounted on said lower end of said strut;

said linkage section of said sideframe member pivotably connected to said follower means in said upper track means of each of said track assemblies and said upper end of said shoe support strut, said pivotable connections spaced and connected towards opposite ends of said linkage section; and said shoe support strut pivotably connected to said follower means in said middle and lower track means, said pivotable connections spaced from one another and generally adjacent said upper end of said strut whereby as said follower means in said middle and lower track means are moved in response to movement of said side frame member, said shoe support strut is tilted to move said shoe means generally parallel with the load-carrying platform of a hand truck.

7. An unloading shoe subassembly for use in combination with a hand truck having a frame which includes an upright frame section and a load-carrying platform mounted on said upright frame section at a lower end thereof and having a pair of wheels attached to the frame by an axle, said subassembly comprising;

a pair of sideframe members each having an upper end, a center section and a lower linkage section;

a handle extending between and connecting said upper ends of said sideframe members;

a pair of wheeled track assemblies for mounting on said frame such that each sideframe member is adjacent one of said wheeled track assemblies and said wheeled track assemblies are generally parallel with one another and generally perpendicular to the load-carrying platform;

each of said wheeled track assemblies including at least two track means and support means, said at least two track means mounted on said support means in generally coplanar relation with each other;

follower means slidably mounted within each of said track means;

a shoe assembly including shoe means and at least one shoe support strut having upper and lower ends, said shoe means mounted on said lower end of said strut;

said linkage sections of said sideframe members pivotably connected to said follower means in at least one of said track means and said upper end of said shoe support strut, said pivotable connections spaced and connected at opposite ends of said linkage sections; and said shoe support strut pivotably connected to at least two of said follower means in said at least two track means, said pivotable connections spaced from one another and generally adjacent said upper end of said strut whereby as said follower means in said at least two track means are moved, said shoe support strut is tilted to move said shoe means generally parallel with the load-carrying platform of a hand truck.

* * * * *